(12) United States Patent
Hunur (10) Patent No.: US 8,290,842 B2
(45) Date of Patent: Oct. 16, 2012

(54) MANAGING AND VALIDATING A BENEFITS PLAN

(75) Inventor: Nagaragj Hunur, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 12/395,435

(22) Filed: Feb. 27, 2009

(65) Prior Publication Data

US 2010/0223076 A1 Sep. 2, 2010

(51) Int. Cl.
G06Q 40/00 (2012.01)
G06Q 10/00 (2012.01)

(52) U.S. Cl. ............................... 705/35; 705/322; 705/4

(58) Field of Classification Search .................. None
See application file for complete search history.

(56) References Cited

U.S. PATENT DOCUMENTS

| | | | |
|---|---|---|---|
| 6,868,528 B2 | 3/2005 | Roberts | |
| 7,251,782 B1 | 7/2007 | Albers et al. | |
| 7,287,032 B2 | 10/2007 | Attili et al. | |
| 7,346,652 B2 | 3/2008 | Berrigan et al. | |
| 8,234,222 B2 * | 7/2012 | Thompson et al. | 705/322 |
| 2002/0032639 A1 * | 3/2002 | Hausken et al. | 705/37 |
| 2002/0103680 A1 | 8/2002 | Newman | |
| 2002/0149616 A1 | 10/2002 | Gross et al. | |
| 2003/0229522 A1 * | 12/2003 | Thompson et al. | 705/4 |
| 2004/0117202 A1 | 6/2004 | Winklevoss et al. | |
| 2004/0172268 A1 | 9/2004 | Franklin et al. | |
| 2004/0267584 A1 * | 12/2004 | Corman | 705/7 |
| 2005/0005269 A1 * | 1/2005 | Zilavy | 717/170 |
| 2005/0188332 A1 | 8/2005 | Colman | |
| 2006/0212362 A1 * | 9/2006 | Donsbach et al. | 705/26 |
| 2006/0235730 A1 * | 10/2006 | Politano et al. | 705/4 |
| 2006/0235731 A1 * | 10/2006 | Gupta et al. | 705/4 |
| 2006/0235737 A1 | 10/2006 | Fleurant et al. | |
| 2006/0235738 A1 * | 10/2006 | Doyle et al. | 705/9 |
| 2007/0203756 A1 * | 8/2007 | Sears et al. | 705/4 |
| 2007/0233515 A1 * | 10/2007 | Mehus et al. | 705/2 |
| 2007/0250615 A1 * | 10/2007 | Hillier | 709/223 |
| 2011/0295760 A1 * | 12/2011 | Hunur et al. | 705/322 |

* cited by examiner

*Primary Examiner* — Harish T Dass
*Assistant Examiner* — Edward Baird
(74) *Attorney, Agent, or Firm* — Squire Sanders (US) LLP (57) ABSTRACT

Systems and methods provide a tabular interface for validating and analyzing a benefits plan. The tabular interface illustrates how various parts of a benefits plan may be configured or must be configured, and shows the relationships between those elements. One embodiment allows benefits plan administrators to easily and quickly understand the different elements that need to be created, which elements are mandatory, and where these elements should be linked together. Thus, a starting point is provided to users to analyze what elements should be created to meet plan requirements, and how these elements should be configured.

18 Claims, 6 Drawing Sheets

MANAGING AND VALIDATING A BENEFITS PLAN

FIELD OF THE INVENTION

One embodiment is directed to benefits plan administration, and more particularly directed to the validation of a benefits plan.

BACKGROUND INFORMATION

Human capital management ("HCM") applications allow you to set up employer benefit plans such as health insurance, dental insurance, pension plans, etc. They also allow you to set up eligibility and enrollment requirements for these plans, to control who should receive benefits, and the period for which they can receive benefits. Plan design is an administrative task performed by the benefits specialist. The benefits specialist decides on the plans to be offered, options within these plans, the eligibility and enrollment requirements of these plans, and the costs to be borne by the user and the employer. Similar tasks are performed for a number of plans resulting in the creation and interlinking of several plan objects. These plans are pulled together under a program for convenience of managing these objects. This hierarchy of objects is collectively called compensation object hierarchy.

Today, however, companies are facing more complex conditions that require better (more granular) control and flexibility. This is especially required for those businesses that need to comply with statutory calculations, and handle benefits across assignments. This results in more complex plan design and more objects. In the existing approach, each object or a small group of objects are built by using different screens. Then, these objects are interlinked using a separate screen. With the present approach, the user needs to understand the order in which the objects need to be created and then linked together to build the complete hierarchy. Benefits specialists have to be able to understand and manage these complex set of objects.

SUMMARY OF THE INVENTION

One embodiment is a system for managing a benefits plan that allows a benefits plan administrator to easily understand complex benefits plans, to correctly configure them, and validate that configuration. The system receives a request to validate a configured benefits plan. This benefits plan comprises a plurality of plan elements and at least one relationship between a first plan element and a second plan element. The system then validates the benefits plan by comparing the plurality of plan elements and at least one relationship to a template. The system then displays a tabular user interface to a user that indicates the validity of any relationships. This tabular user interface is easily understood by the benefits plan administrator.

DETAILED DESCRIPTION

Systems and methods in accordance with an embodiment are directed to a tabular interface for validating and analyzing a benefits plan. The tabular interface illustrates how various parts of a benefits plan may be configured or must be configured, and shows the relationships between those elements. An embodiment allows benefits plan administrators to easily and quickly understand the different elements that need to be created, which elements are mandatory, and how these elements should be linked together. Thus, a starting point is provided to users to analyze what elements should be created to meet plan requirements, and how these elements should be configured without intimate knowledge of the interfaces within a benefits configuration application.

Figure 1:
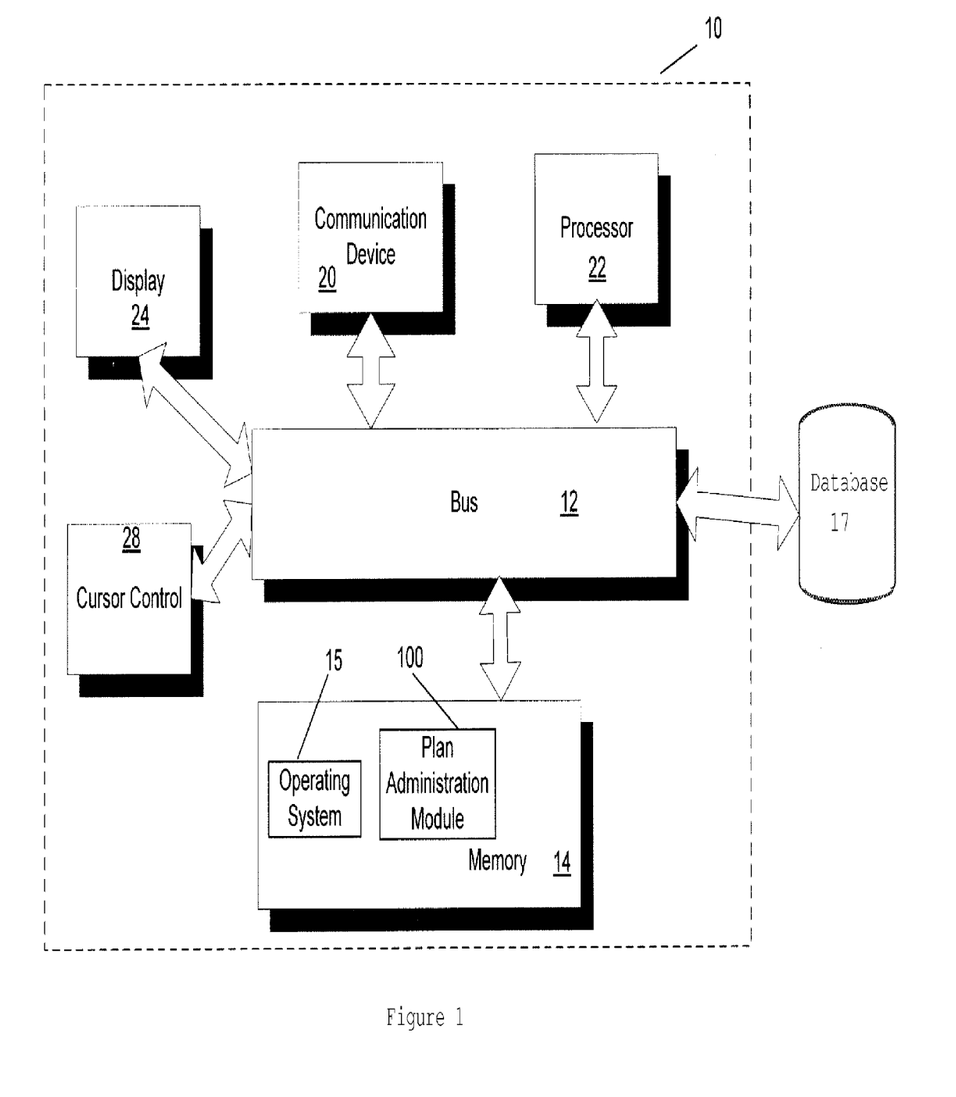
FIG. 1 is a block diagram of a system that can implement plan administration and validation in accordance with an embodiment.

FIG. 1 is a block diagram of a system 10 that can implement an embodiment of a plan administration system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a plan administration module 100. This module is described in greater detail below. System 10 may be further coupled to a database 17 for storing additional data.

A benefits program refers to a plan (e.g., health/dental/life/disability insurance benefit plan, 401 (k) retirement plan), a policy (e.g., policy manual on sexual harassment in the workplace), an event (e.g., having a baby or getting married), etc. The content of a benefits program refers to all of the information used to describe that benefits program. For example, a health insurance benefit plan may apply to an employee's child over the age of 18 as long as the child is registered as a full-time student. The information describing whether such coverage is allowed and the requirements of such coverage constitutes a portion of the content of this health benefit program. The particular sentence or paragraph describing this particular benefit (i.e., coverage of a child over 18) can be referred to as a plan element, as this sentence or paragraph description is a portion of all of the content that makes up the complete configuration of the health insurance benefit. The plan element can include both a template, shared across benefits programs, and variables that may also be shared across benefits programs or be specific to a single benefit program. The variables can be used to generate content dynamically, and such variables also can be considered part of the content.

Figure 2:
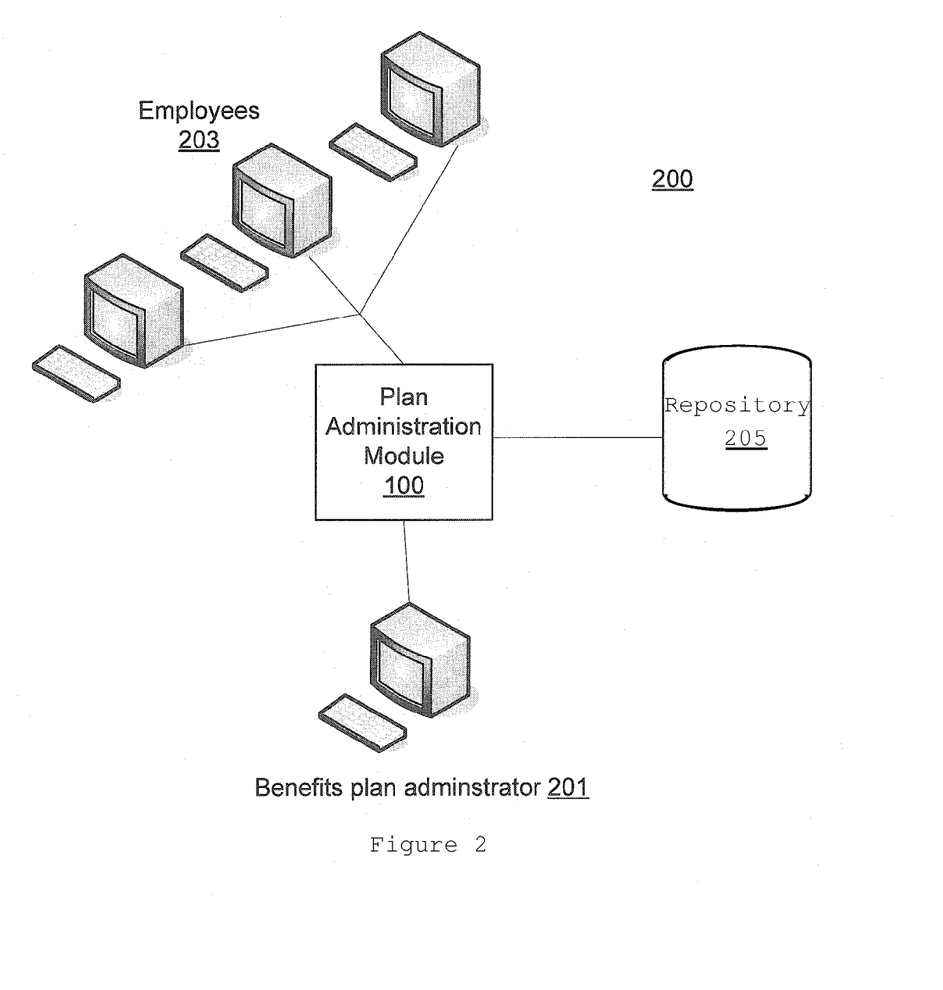
FIG. 2 illustrates an exemplary logical diagram modeling the relationship between benefits plan administration module and other entities in accordance with an embodiment.

FIG. 2 illustrates an exemplary logical diagram 200 modeling the relationship between benefits plan administration module 100 and other entities in accordance with an embodiment. Generally, the plan administration module 100 allows a benefits plan administrator 201 to manage all of the content of benefits programs for one or more organizations. The plan administration module 100 also enables employees 203 of an organization to access content related to benefits programs the organization offers, providing access to answers about the benefits programs. The plan administration module 100 also maintains the accuracy of the data, changing the content when necessary, and allows benefits plan administrator 201 to maintain the technology (e.g., the system 10) required to provide these services. The plan administration module 100 manages the interface between the benefits plan administrator 201 and the repository 205 (which may be database 17) in which the benefits program content, such as templates and configurations, is stored. The repository 205 serves as the centralized storage for all of the plan content and is used to store and access the content of the benefits programs.

Figure 3:
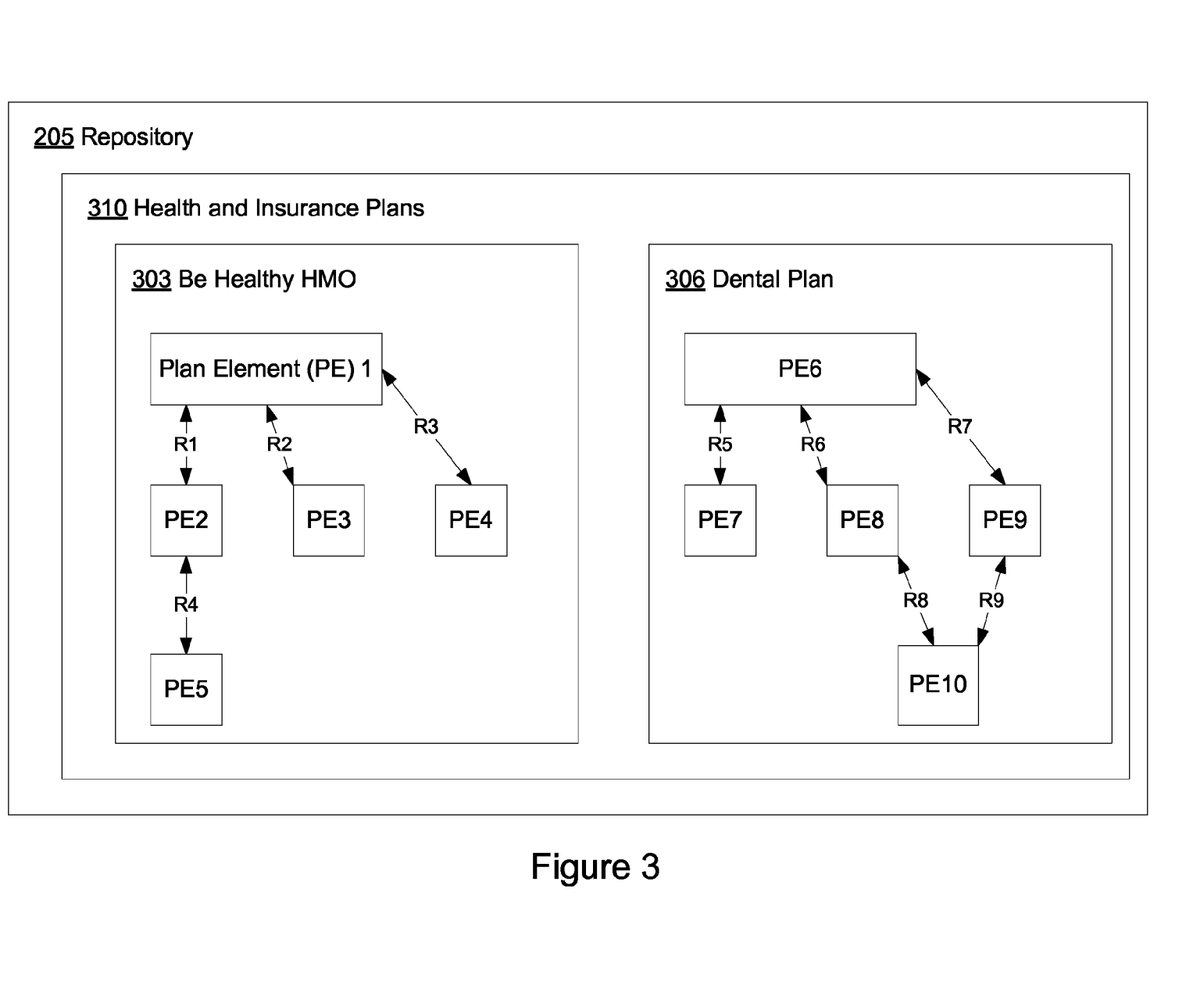
FIG. 3 illustrates an exemplary logical diagram modeling a benefits program in accordance with an embodiment.

FIG. 3 illustrates an exemplary logical diagram 300 modeling a benefits program in accordance with an embodiment. The diagram 300 shows that a health and insurance database 310 within the repository 205 includes two benefits programs, a health plan 303 and a dental plan 306. The content of the health plan 303 and the dental plan 306 is modeled by a collection of plan elements having certain relationships with other plan elements. In the health plan 303, a plan element PE1 has a relationship R1 with a plan element PE2, a relationship R2 with a plan element PE3, and a relationship R3 with a plan element PE4. The plan element PE2 has a relationship R4 with a plan element PE5. Similarly, in the dental plan 306, a plan element PE6 has a relationship R5 with a plan element PE7, a relationship R6 with a plan element PE8, and a relationship R7 with a content element PE9. The content elements PE8 and PE9 have relationships R8 and R9, respectively, with a plan element PE10.

A plan element is a portion of the benefits program content and can be, for example, a sentence, a paragraph, a section of multiple paragraphs, a variable, or some combination of these describing an element or rule of the benefits plan. The following examples describe plan elements describing the eligibility of dependents and are used in conjunction with FIG. 3 to help illustrate an example of plan elements and their relationships. The plan element PE1 represents the following template:

Eligibility of a Dependent

If your dependent is under the age of 18, your dependent is eligible under your health_plan_name health insurance.
IF dependent_eligibility_over_18=TRUE,
THEN INCLUDE PE2

This exemplary template includes the variable health_plan_name, the value for which is inserted when the system 10 generates this plan element for viewing. The value for the variable health_plan_name varies by plan. The value for the variable health_plan_name, and any other variables may be retrieved from the repository 205 or from an external source. For the health plan 303, the value of the variable health_plan_name is Be Healthy HMO. The exemplary template above is plan element PE1, so the variable health_plan_name is plan element PE3 and the association between the template and the variable for this plan is the relationship R2. The relationship R2 can be implemented using, for example, a database table. In this example, there can be one or more rows in a table for the health plan 303 identifying that the plan element PE1 is the template above and the associated value for the variable health_plan_name is Be Healthy HMO.

The PE1 exemplary template above also includes the variable dependent_eligibility_over 18, the value for which is used by the system 10 to determine whether the IF condition is met. The value for the variable dependent_eligibility_over_18 varies by plan. For the health plan 303, the value of the variable dependent_eligibility_ove_18 is 'true.' The exemplary template above is plan element PE1, so the variable dependent_eligibility_over_18 is plan element PE4 and the association between the template and the variable for this plan is the relationship R3. The relationship R3 can be implemented using, for example, the same database table as R2. Similar to above, the plan element of the variable PE4 can also have a relationship (not shown) to a question content element as follows: DOES THIS HEALTH PLAN ALLOW DEPENDENT COVERAGE FOR A DEPENDENT OVER THE AGE OF 18? If the conditional statement of the PE1 exemplary template is TRUE, then the system 10 includes the plan element PE2 when generating the plan for viewing and validation.

Benefits plan administrators may use various tools to configure plan elements and the relationships among them to define specific features of a benefits plan, as know by those of ordinary skill in the art. These relationships can quickly become complex and difficult to manage. Some existing tools rely on tree structures to define and view elements of a benefits plan. However, a tree structure may become unwieldy with a complex plan, requiring the user to navigate through every node to manually validate the plan elements and their relationships.

Figure 4:
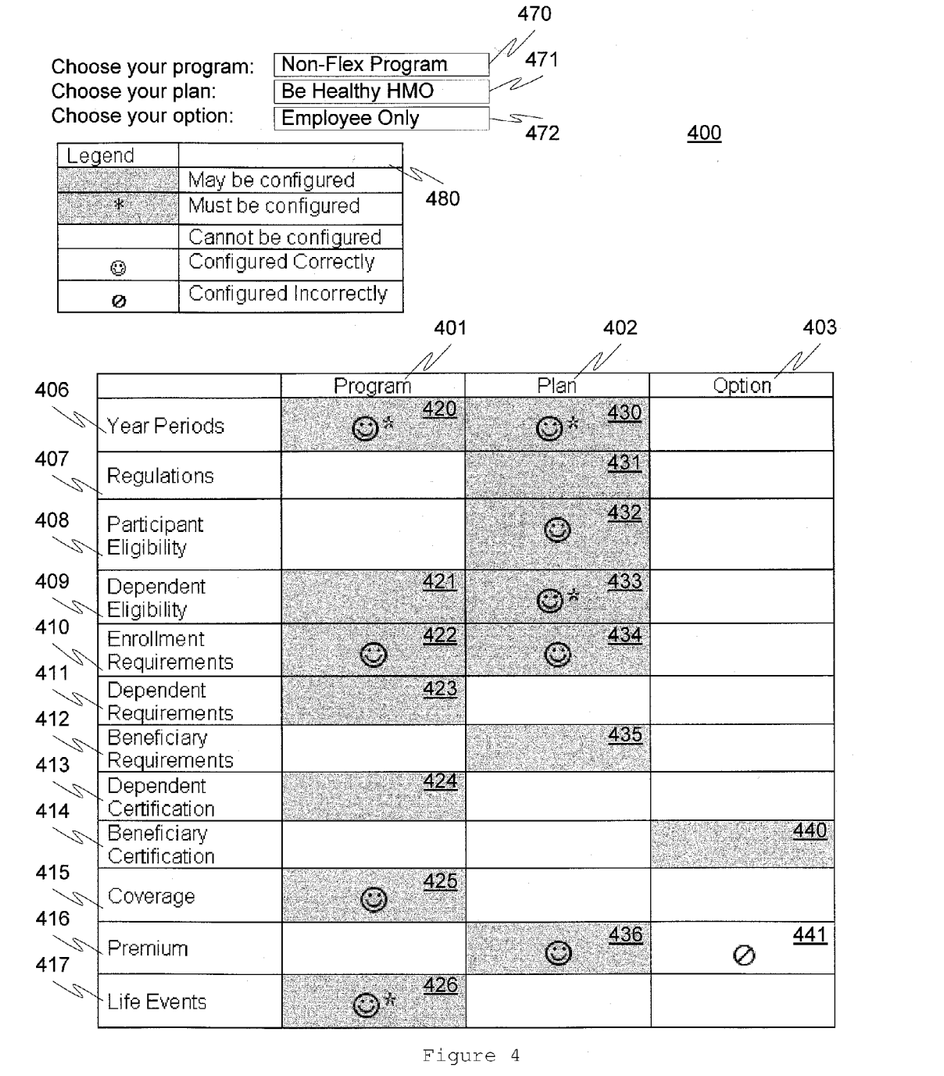
FIG. 4 illustrates an example tabular interface for validating benefit plan information in accordance with an embodiment.

FIG. 4 illustrates an example tabular interface 400 for validating benefit plan information in accordance with an embodiment by providing a big-picture view of plan elements that allows a benefits plan administrator to quickly understand the requirements and the success of a plan configuration. Tabular interface 400 includes columns of plan elements, including program PE 401, plan PE 402, and options PE 403. Tabular interface 400 further includes rows of more granular plan elements, including year periods PE 406, regulations PE 407, participant eligibility PE 408, dependent eligibility CE 409, enrollment requirements PE 410, dependent requirements PE 411, beneficiary requirements PE 412, dependent certification PE 413, beneficiary certification PE 414, coverage PE 415, premium PE 416, and life events PE 417. The intersections of the rows and columns of tabular interface 400 represent the relationships among the various plan elements. Legend 480 describes the indicators that illustrate five types of relationships: a shaded box indicates that a relationship between these content elements may be configured; a shaded box with an asterisk symbol indicates that a relationship between these content elements must be configured; a non-shaded box indicates that there is no relationship to configure between these content elements; a smile symbol indicates that the relationship is correctly configured; and a circle slash symbol indicates that the relationship is incorrectly configured or should not exist. Tabular interface further includes program menu 470, plan menu 471, and coverage menu 472, for selecting a benefits program, plan, and coverage, respectively. The function of tabular interface 400 will be further described by way of example.

Figure 5:
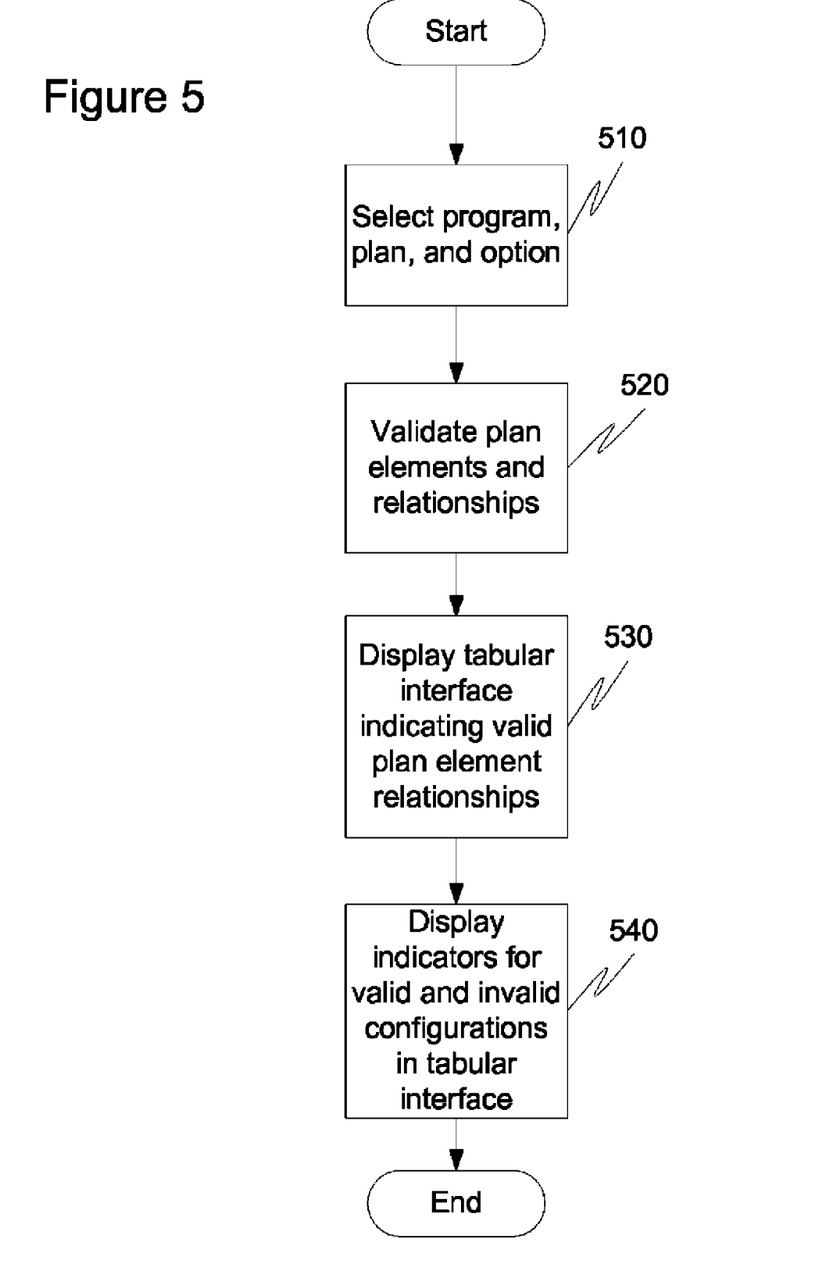
FIG. 5 illustrates a flow diagram of the functionality of plan administration module and a tabular interface in accordance with an embodiment.

FIG. 5 illustrates a flow diagram of the functionality of plan administration module 100 and tabular interface 400 in accordance with an embodiment. In one embodiment, the functionality of the flow diagram of FIG. 5 is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. A benefits administrator selects a benefits program (e.g., non-flex programs), plan (e.g., Be Healthy HMO), and coverage (e.g., employee only) using program menu 470, plan menu 471, and coverage menu 472 (510). When the benefits administrator clicks on the validate button 480, the plan administration module 100 validates the contents elements, relationships, and variables against templates stored in repository 205 (520). The results of the validation are displayed in tabular interface 400, wherein the intersection of columns and rows indicate relationships between content elements (530). As previously described, a shaded box indicates that a relationship between these content elements may be configured, a shaded box with an asterisk symbol indicates that a relationship between these content elements must be configured, a non-shaded box indicates that there is no relationship to configure between these content elements. The tabular interface may further display configuration indicators indicating whether the current configuration of the benefits plan is valid (540). As previously described, a smile symbol indicates that the relationship is correctly configured, and a circle slash symbol indicates that the relationship is incorrectly configured or should not exist.

A description of the example validation results in example tabular interface 400 is now described row by row with reference to FIG. 4. Boxes 420 and 430 indicate that the year periods for the program and plan are correctly configured for program PE 401 and plan PE 402. The asterisk further indicates that these elements must be configured for the program and plan. Box 431 indicates that regulations (e.g., government requirements regarding a qualified health plan) may be configured for the plan 402. Box 432 indicates that participant eligibility requirements (e.g., an employee not on leave) have been correctly configured for plan PE 402. Box 421 indicates that dependent eligibility requirements (e.g., a dependent under age 18) may be configured for the program PE 401, and box 433 indicates that this element has been correctly configured for the plan PE 402. Boxes 422 and 434 indicate the enrollment requirements have been properly configured for program PE 401 and plan 402, and that this configuration is mandatory for plan 402 (see the asterisk). Box 423 indicates that dependent requirements may be configured for program PE 401, and box 435 indicates the beneficiary requirements (e.g., blood relative) may be configured for plan PE 402. Box 424 indicates that dependent certification (e.g., a requirement of evidence that the dependent is in school) may be configured for program PE 401. Box 440 indicates that beneficiary certification (e.g., a birth certificate) may be configured for option PE 403. Box 425 indicates that a coverage configuration (e.g., co-pay requirements) is valid for program PE 401. Box 436 indicates that a premium configuration (e.g., the amount deducted from the employee paycheck for the benefit plan) is valid for plan PE 402. Box 441 indicates that the premium configuration is not valid for option PE 403. Box 426 indicates that a life event configuration (e.g., new hire, new dependent, termination, etc.) is valid for program PE 401, and that this configuration is required.

Figure 6:
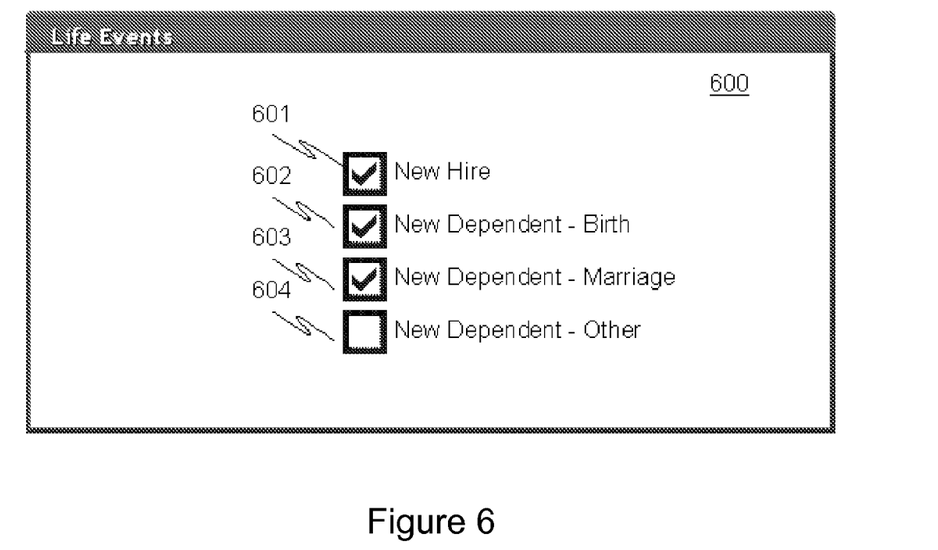
FIG. 6. illustrates an example configuration interface for a life event program element in accordance with an embodiment.

In one embodiment, a benefits plan administrator may alter the configuration of a program, plan, or option from tabular interface 400. For example, the benefits plan administrator may click on box 426 to obtain an interface for changing a life event configuration. FIG. 6. illustrates an example configuration interface 600 for life event PE 417 in accordance with an embodiment. Configuration interface 600 includes checkboxes for different life events, including new hire checkbox 601, new dependent—birth checkbox 602, new dependent—marriage checkbox 603, and new dependent—other checkbox 604. In the example, the unchecked new dependent—other checkbox 604 indicates that this option is not a life event for program PE 401, while the others are. This feature allows the benefits plan administrator to navigate to the correct screen to change the configuration for a plan element if validation fails.

In another embodiment, when there is no current configuration for the program, plan, and/or option, the smile and circle slash symbols are not displayed, as there is no configuration to validate. However, the benefits plan administrator can still use tabular interface 400 as an aid to obtain a big picture of plan configuration, as tabular interface 400 still indicates what elements the benefits plan administrator must configure, can configure, and cannot configure.

Thus, a tabular interface for validating and analyzing benefits plan data is disclosed. The tabular interface allows the benefits plan administrator to gain a big picture of a benefits plan, including what can be configured, what must be configured, and what cannot be configured. The tabular interface can be used to verify that plan elements have valid configurations and can quickly identify mistakes in plan design. By providing the ability for the benefits plan administrator to navigate to the correct screen to correct or change a configuration for a plan element, mistakes in plan configuration are mitigated with minimal learning curve for understand the plan design and architecture.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method of managing a benefits plan comprising a plurality of features, the method comprising:
   receiving from a user interface generated by a processor a configuration of a content of the benefits plan, wherein the configuration is generated by a provider of the benefits plan before the benefits plan is offered to a participant of the benefit plan;
   wherein the benefits plan comprises a plurality of plan elements and a plurality of relationships between the plurality of plan elements, and the configuration defines the plurality of features using the plan elements and the relationships;
   validating the benefits plan by the processor by comparing the plan elements and the relationships to at least one template, wherein the validation comprises determining if all required relationships between plan elements have been correctly configured; and
   displaying by the processor a tabular user interface indicating the validity of the relationships, wherein the user interface comprises a plurality of rows of plan elements and a plurality of columns of plan elements, the plurality of rows and columns forming a plurality of intersections, wherein each intersection defines a first relationship between corresponding row and column plan elements;

wherein the user interface comprises a first graphical indicator within an intersection that indicates a result of the validation for the corresponding relationship defined by the intersection;

wherein the benefits plan is validated before being offered to the participant of the benefits plan.

2. The method claim 1, further comprising indicating by the first graphical indicator whether the corresponding relationship between the two plans must be configured, can be configured, or cannot be configured by a benefits plan administrator when configuring the benefits plan.

3. The method of claim 2, wherein the intersection of the rows and columns of the tabular user interface includes a second graphical indicator of the relationship between two plan elements.

4. The method of claim 3, further comprising indicating by the second graphical indicator whether a configuration of the relationship between two plan elements is one of valid or invalid.

5. The method of claim 1, further comprising spawning a window interface for configuring the relationship between two plan elements in response to a user clicking on the intersection of the rows and columns.

6. The method of claim 1, further comprising receiving a request to modify the benefits plan in response to displaying at least one of the relationships is invalid.

7. The method of claim 1, wherein the plurality of plan elements comprises coverage, premium, and life event plan elements.

8. The method of claim 1, wherein the plurality of plan elements comprises enrollment requirements, dependent requirements, and beneficiary requirements plan elements.

9. The method of claim 6, wherein the plurality of plan elements comprises participant eligibility, dependent eligibility, and beneficiary eligibility plan elements.

10. A tangible computer-readable medium having instructions stored thereon that, when executed by a processor, causes the processor to manage a benefits plan by:

receiving from a user interface generated by the processor a configuration of a content of the benefits plan, wherein the configuration is generated by a provider of the benefits plan before the benefits plan is offered to a participant of the benefit plan;

wherein the benefits plan comprises a plurality of plan elements and a plurality of relationships between the plurality of plan elements, and the configuration defines the plurality of features using the plan elements and the relationships;

validating the benefits plan by the processor by comparing the plan elements and the relationships to at least one template, wherein the validation comprises determining if all required relationships between plan elements have been correctly configured; and displaying by the processor a tabular user interface indicating the validity of the relationships, wherein the user interface comprises a plurality of rows of plan elements and a plurality of columns of plan elements, the plurality of rows and columns forming a plurality of intersections, wherein each intersection defines a first relationship between corresponding row and column plan elements;

wherein the user interface comprises a first graphical indicator within an intersection that indicates a result of the validation for the corresponding relationship defined by the intersection;

wherein the benefits plan is validated before being offered to the participant of the benefits plan.

11. The computer-readable medium of claim 10, further comprising indicating by the first graphical indicator whether the corresponding relationship between the two plans must be configured, can be configured, or cannot be configured by a benefits plan administrator when configuring the benefits plan.

12. The computer-readable medium of claim 11, wherein the intersection of the rows and columns of the tabular user interface includes a second graphical indicator of the relationship between two plan elements.

13. The computer-readable medium of claim 12, further comprising indicating by the second graphical indicator whether a configuration of the relationship between two plan elements is one of valid or invalid.

14. A computer-implemented system for managing a benefits plan, comprising:

a user interface generated by a processor that receives a configuration of a content of the benefits plan, wherein the configuration is generated by a provider of the benefits plan before the benefits plan is offered to a participant of the benefit plan a database storing the benefits plan and a benefits plan template, wherein the benefits plan comprises a plurality of plan elements and a plurality of relationships between the plurality of plan elements, and the configuration defines the plurality of features using the plan elements and the relationships;

a benefits plan administration module that validates the benefits plan against the benefits plan template, wherein the validation comprises determining if all required relationships between plan elements have been correctly configured; and a tabular user interface module displaying the results of the validation in the user interface, wherein the user interface comprises a plurality of rows of plan elements and a plurality of columns of plan elements, the plurality of rows and columns forming a plurality of intersections, wherein each intersection defines a first relationship between corresponding row and column plan elements;

wherein the user interface comprises a first graphical indicator within an intersection that indicates a result of the validation for the corresponding relationship defined by the intersection;

wherein the benefits plan is validated before being offered to the participant of the benefits plan.

15. The system of claim 14, the user interface further indicating by the first graphical indicator whether the corresponding relationship between the two plans must be configured, can be configured, or cannot be configured by a benefits plan administrator when configuring the benefits plan.

16. The system of claim 15, wherein the intersection of the rows and columns of the tabular user interface includes a second graphical indicator of the relationship between two plan elements.

17. The system of claim 16, the user interface further indicating by the second graphical indicator whether a configuration of the relationship between two plan elements is one of valid or invalid.

18. The system of claim 16, the user interface further receiving a request to modify the benefits plan in response to displaying at least one of the relationships is invalid.

* * * * *

UNITED STATES PATENT AND TRADEMARK OFFICE
CERTIFICATE OF CORRECTION

PATENT NO.        : 8,290,842 B2                                    Page 1 of 1
APPLICATION NO.   : 12/395435
DATED             : October 16, 2012
INVENTOR(S)       : Hunur It is certified that error appears in the above-identified patent and that said Letters Patent is hereby corrected as shown below:

On Title page, Item (75), in column 1, under "Inventor", line 1, delete "Nagaragj Hunur," and insert -- Nagaraj M. Hunur, --, therefor.

On Title page, Item (56), in column 2, under "U.S. Patent Documents", line 8, delete "Colman" and insert -- Kolman --, therefor.

In column 2, line 7, delete "FIG. 6." and insert -- FIG. 6 --, therefor.

In column 4, line 19, delete "ove" and insert -- over --, therefor.

In column 6, line 8, delete "FIG. 6." and insert -- FIG. 6 --, therefor.

In column 7, line 11, in Claim 2, after "method" insert -- of --.

In column 8, line 62, in Claim 18, delete "claim 16," and insert -- claim 14, --, therefor.

Signed and Sealed this
Fifteenth Day of January, 2013

David J. Kappos
*Director of the United States Patent and Trademark Office*